United States Patent [19]

Pandorf

[11] Patent Number: 5,271,277
[45] Date of Patent: Dec. 21, 1993

[54] CAPACITANCE PRESSURE TRANSDUCER

[75] Inventor: Robert C. Pandorf, Newton Highlands, Mass.

[73] Assignee: The BOC Group, Inc., New Providence, N.J.

[21] Appl. No.: 812,785

[22] Filed: Dec. 23, 1991

[51] Int. Cl.$^5$ .............................. G01L 9/12
[52] U.S. Cl. ...................... 73/724; 73/708; 73/756; 361/283.4
[58] Field of Search ............ 73/724, 707, 718, 706, 73/756, 708; 361/283

[56] References Cited

U.S. PATENT DOCUMENTS

| | | | |
|---|---|---|---|
| 3,195,028 | 7/1965 | Werner et al. | 73/724 |
| 4,358,814 | 11/1982 | Lee et al. | 73/724 |
| 4,370,890 | 2/1983 | Frick | 73/718 |
| 4,389,895 | 6/1983 | Rud, Jr. | 73/274 |
| 4,414,851 | 11/1983 | Maglic | 73/724 |
| 4,426,769 | 1/1984 | Grabbe | 29/588 |
| 4,823,603 | 4/1989 | Ferran et al. | 73/724 |
| 4,920,805 | 5/1990 | Yajima et al. | 73/727 |
| 5,134,887 | 8/1992 | Bell | 73/724 |

*Primary Examiner*—Donald O. Woodiel
*Attorney, Agent, or Firm*—David M. Rosenblum; Larry R. Cassett

[57] ABSTRACT

The present invention provides a capacitance pressure transducer of increased thermal and mechanical stability and thus performance over prior art designs. A cell formed by a cell housing containing a plane parallel capacitor plate and an inlet tube is connected to an outer protective cover solely by the inlet tube. The cell housing is contained within an air tight environmental enclosure (also supported solely by the inlet tube) of sufficient rigidity as to isolate the cell housing from changes in atmospheric pressure. The plane parallel capacitor plate is formed by a circular diaphragm peripherally connected to the tension ring and an electrode disk located within the tension ring. The capacitor plate is mechanically isolated by a connection between the tension ring and the cell housing that is more flexible than the tension ring itself and a mounting for the electrode disk by which the electrode disk is connected solely to the tension ring by an annular support member holding the electrode disk in a fixed position relative to the diaphragm. Additionally a baffle plate divides the cell housing into baffle and diaphragm chambers to allow the gas to reach thermal equilibrium with the cell before exposure thereof to the diaphragm. Also, the baffle chamber and inlet tube have characteristic dimensions greater than the mean free path of gas molecules at the lowest pressure to be measured to suppress thermal transpiration effects.

59 Claims, 3 Drawing Sheets

CAPACITANCE PRESSURE TRANSDUCER

BACKGROUND OF THE INVENTION

The present invention relates to a capacitance pressure transducer to measure the pressure of a gas.

Capacitance pressure transducers are constructed around a plane parallel capacitor plate formed by a diaphragm (normally a metal membrane) supported by a diaphragm tension support ring, herinafter referred to as a "tension ring" and an electrode disk (normally ceramic deposited with a conductive material). The diaphragm deflects relative to the electrode disk under application of the gas pressure to in turn produce a capacitance having a direct correlation to the gas pressure. The capacitance is electronically converted into a read out measurement of the gas pressure.

The plane parallel plate capacitor is housed to form a cell. The cell is formed by a cell housing that contains the plane parallel plate capacitor and an inlet tube through which the gas to be measured enters the cell housing. Conventionally, the cell housing is provided with opposed end covers that are welded to the tension ring at or near the vicinity of the diaphragm attachment point. The electrode disk is held in position by a spring against reference surfaces provided on the tension ring. The mounting of the electrode disk allows for differential thermal expansion between the tension ring and the electrode disk while maintaining the proper positioning of the electrode disk relative to the diaphragm. A baffle formed by a plate or wire mesh screen is positioned at the diaphragm end of the inlet tube. The baffle acts as a heat radiation shield for the diaphragm. The baffle has a secondary purpose of protecting the diaphragm from objects which may fall down the inlet tube.

In prior art capacitance pressure transducers, an external enclosure is provided to mechanically protect the cell and also to mount the electrical components used in performing the electronic gas pressure measurement. Both the cell housing and the inlet tube are connected to the external enclosure. Additionally, a heated inner enclosure of thin drawn configuration can be provided within the external enclosure to house the cell housing. The cell housing and components contained within the cell housing are maintained within the heated inner enclosure at a nearly constant temperature, above the ambient temperature, to surpress environmental temperature changes from producing thermal induced changes in the pressure responsive elements contained within the cell housing.

It has been found by the inventor herein that several factors related to the design of prior art capacitance pressure transducers act to degrade performance characteristics of such prior art transducers. As will be discussed, these factors have been isolated in the present invention to provide a capacitance pressure transducer having improved performance characteristics over the prior art.

SUMMARY OF THE INVENTION

The present invention provides a capacitance pressure transducer comprising, an external enclosure, an air tight environmental enclosure located within the external enclosure, and a cell having a cell housing and an inlet tube connected to the cell housing. The cell housing is located within the air tight environmental enclosure and the inlet tube extends through aligned, outer and inner inlet tube openings defined in the external and environmental enclosures.

In prior art capacitance pressure transducer designs no attempt is made to isolate the cell from atmospheric pressure effects. In this regard, it has been found by the inventor herein that variations in atmospheric pressure can deform the cell housing and thus effect both the positioning of the diaphragm relative to the electrode disk and the tension of the diaphragm. As a result, cells of the prior art are not found to have stable drift free behavior under exacting operating conditions. In order to correct this deficiency, the air tight environmental enclosure of the present invention is designed to have a sufficient rigidity so as essentially, not to deform in response to changes in atmospheric pressure. The cell housing is located within the environmental enclosure so that changes in atmospheric pressure do not deform the cell housing.

The cell housing of the present invention contains a tension ring and a circular diaphragm peripherally connected to the tension ring. An electrode disk is located within the tension ring and is positioned so as to form a plane parallel capacitor plate with the diaphragm. It has been found that the prior art welded attachment of the tension ring to the cell housing and the mounting of the electrode disk within the cell housing also present problem areas that can effect performance. The welded attachment of the tension ring to the cell housing produces a circular stress band around the tension ring along the line of weld between the tension ring and the cell housing. This stress band can create stress and distortion in the tension of the diaphragm and in the diaphragm's plane of attachment. The end result of this is reduced diaphragm tension control, non-uniform diaphragm tension, out of plane diaphragm, and long term material stress creep which will contribute to instrument drift. As to the electrode disk, the prior art spring mounting of the electrode disk within the housing allows the electrode disk to move by sliding within the tension ring. Such mounting leads to a non-fixed multiple positioning of the electrode disk which produces sensor capacitance changes not related to pressure measurements. In other words, such non-fixed multiple positioning of the electrode disk can act as a source of thermal hysterisis.

The problem area concerning the tension ring attachment is overcome in the present invention by the provision of an improved tension ring connection means for connecting the tension ring to the cell housing. In accordance with the present invention, the tension ring connection means has a lower stiffness than the tension ring so that thermal and mechanical loadings applied to the tension ring through the cell housing essentially produce stress and strain within the tension ring connection means rather than in the tension ring itself and therefore, the diaphragm. Additionally, an improved electrode disk connection means is provided in order to alleviate performance problems associated with the mounting of the electrode disk. The electrode disk connection means of the present invention connects the electrode disk solely to the tension ring so that the electrode disk is held in a fixed position relative to the diaphragm and differential thermal expansion is permitted between the electrode disk and the tension ring. As may be appreciated, movement of the tension ring connection means of the present invention will produce movement in the tension ring. However, the sole connection of the electrode disk to the tension ring will cause the electrode disk to move as a single unit with the tension ring. Since, the electrode disk is held in a fixed position relative to the diaphragm, the alignment between the diaphragm and the electrode disk will be maintained through thermal and mechanical induced actions and also, prior art multiple positioning problems of the electrode disk will be substantially reduced.

The inlet tube of the cell of the present invention, is in communication, at one end, with the interior of the cell housing in order to expose the diaphragm to the gas to be measured. In the prior art, The cell is connected to the external enclosure at both the inlet tube and the cell housing. Such multi-point connections of the cell to the external enclosure can permit external forces and torques applied to the external enclosure to be transmitted to the cell housing and thus, the diaphragm. As a result, shifts in pressure readout can arise that are completely independent of the pressure being measured. Another disadvantage of the multi-point attachment is that a concentrated point for heat leakage is created that can produce adverse thermal gradients in the cell housing. These problems are overcome in the present invention by having the inlet tube acting as the sole connection of the cell housing to the external enclosure so that the cell is held isolated from external torques or thermal gradients.

The present invention also provides baffle means. Prior art baffle design can also act as a source of poor transducer performance. Prior art baffle plates pose a problem in that they afford an opportunity for thermal gradients in the gas to exist within the cell. Such thermal gradients can adversely affect the diaphragm by changing its tension and in turn the precision of the gas pressure measurement. Additionally, prior art baffles do little to reduce thermal transpiration errors arising from the maintenance of the cell at above ambient temperatures. In one important aspect, the baffle means of the present invention divide the cell housing, between the inlet tube and the diaphragm, into a diaphragm chamber proximally located with respect to the diaphragm and a baffle chamber located between the diaphragm chamber and the inlet tube. The gas flows through the baffle chamber and then, the diaphragm chamber so that the gas is allowed to reach thermal equilibrium with respect to the cell before reaching the diaphragm. As such, heat transfer between the diaphragm and the gas is substantially reduced in order to prevent possible changes in diaphragm tensioning. As will be discussed, the baffle chamber and the inlet tube can be designed to have characteristic dimensions greater than the mean free path of molecules of the gas to substantially eliminate thermal transpiration effects.

In another aspect, the present invention provides a cell for a capacitance pressure transducer that incorporates the tension ring and electrode disk connection means discussed in some detail hereinabove. In accordance with this aspect of the present invention, the cell includes a cell housing and an inlet tube in communication, at one end, with the interior of the cell housing. A tension ring is located within the cell housing and a circular diaphragm is peripherally connected to the tension ring. A tension ring connection means is provided for connecting the tension ring to the cell housing. The tension ring connection means has a lower stiffness than the tension ring so that thermal and mechanical loadings applied to the cell housing essentially produce deformation in the tension ring connection means rather than in the tension ring and therefore, the diaphragm. An electrode disk is located within the tension ring and is positioned so as to form a plane parallel capacitor plate with the diaphragm. An electrode disk connection means is provided for connecting the electrode disk solely to the tension ring so that the electrode disk is held in a fixed position relative to the diaphragm and differential thermal expansion is permitted between the electrode disk and the tension ring.

The connection between the tension ring and the cell housing, the connection between the electrode disk and the tension ring, the baffle, the environmental enclosure as well as other aspects of the subject invention that have been discussed above can be individually incorporated into a prior art capacitance pressure transducer to increase stability and accuracy of reading. Thus, all of such aspects of the present invention stand in their own right as independent inventions. For instance, the present invention also provides a cell for a capacitance pressure transducer comprising a cell housing, a tension ring located within the cell housing, and a circular diaphragm peripherally connected to the tension ring. An electrode disk is positioned so as to form a plane parallel capacitor plate with the diaphragm. A tension ring connection means is provided for connecting the tension ring to the cell housing. The tension ring connection means has a lower stiffness than the tension ring so that thermal and mechanical loadings applied to the cell housing essentially produce deformation in the tension ring connection means rather than in the tension ring and therefore, the diaphragm. Additionally, the present invention can provide a cell for a capacitance pressure transducer to measure the pressure of a gas. The cell is provided with a cell housing, a tension ring connected to and located within the cell housing, and a circular diaphragm peripherally connected to the tension ring and positioned so as to form a plane parallel capacitor plate with the diaphragm. The electrode disk is connected to the tension ring by an annular support member so that the electrode disk is held in a fixed position relative to the diaphragm. The annular support member has a plurality of fenestrations oriented in an axial direction of the annular support member. The fenestrations divide the annular support member into a plurality of regions capable of flexing upon differential expansion between the tension ring and the electrode disk.

The present invention also provides a cell for a capacitance pressure transducer to measure the pressure of a gas having a plane parallel capacitor plate including a diaphragm. The plane parallel capacitor plate is located within a cell housing and an inlet tube is provided in communication, at one end, with the interior of the housing. A baffle means divides the cell housing, between the inlet tube and the diaphragm, into a diaphragm chamber proximally located with respect to the diaphragm and a baffle chamber located between the diaphragm chamber and the inlet tube. The gas flows through the baffle chamber and then into the diaphragm chamber to allow the gas to reach thermal equilibrium with respect to the cell before reaching the diaphragm.

A further aspect of the present invention concerns the mounting and containment of the cell to again improve stability and accuracy in reading. In this regard, a capacitance pressure transducer is provided having an external enclosure and a cell. The cell includes, a cell housing located within the external enclosure and containing a plane parallel capacitor plate, and an inlet tube. The inlet tube is connected to the cell housing, in communication with the interior of the cell housing and extends through the external enclosure. The cell housing is connected to the external enclosure solely by the inlet tube. In still another aspect, the present invention provides a capacitance pressure transducer having, an external enclosure and a cell. The cell includes a cell housing containing a plane parallel capacitor plate, and an inlet tube connected to the cell housing and extending through the external enclosure. An air tight environmental enclosure is located within the external enclosure and encloses the cell housing with the inlet tube extending therefrom. The environmental enclosure is substantially non-deformable under application of changes in atmospheric pressure to prevent the changes in atmospheric pressure from deforming the cell housing. The environmental enclosure has a sidewall of cylindrical configuration and a circular lid having a peripheral portion configured to closely fit within the sidewall. The sidewall and the lid have opposed grooves and an O-ring is configured to simultaneously seat within the opposed grooves of the sidewall and the lid, to connect the lid to the sidewall in an airtight and self-latching manner.

Another aspect of the present invention concerns the temperature regulation of an environmental enclosure. In accordance with this aspect of the present invention, a capacitance pressure transducer is provided having an external enclosure and a cell. The cell includes a cell housing containing a plane parallel capacitor plate and an inlet tube connected to the cell housing and extending from the external enclosure. Additionally, an environmental enclosure is located within the external enclosure and encloses the cell housing with the inlet tube extending therefrom. An electrical heating means is provided for heating the environmental enclosure and thereby the cell housing and the plane parallel capacitor plate to a temperature above the surrounding ambient atmosphere. A temperature sensing means, connected to the ennvironmental enclosure is provided for generating a signal referable to the temperature of the environmental enclosure. Such signal is used in controlling the electrical heating means so that the temperature of the environmental enclosure is constant. Electrical conductor means conduct the signal to a temperature controller. The electrical conductor means is connected to the environmental enclosure and in good thermal contact therewith to shunt heat from the environmental enclosure to the temperature sensing means and thereby prevent cooling of the temperature sensing means. The prevention of such cooling will insure that the signal produced by the temperature sensing means is always referable to the temperature of the environmental enclosure rather than being additionally dependent upon changes in surrounding ambient temperature.

BRIEF DESCRIPTION OF THE DRAWINGS

While the specification concludes with claims distinctly pointing out the subject matter that Applicant regards as his invention, it is believed that the invention would be better understood which taken in connection with the accompanying drawings in which:

DETAILED DESCRIPTION

Figure 1:
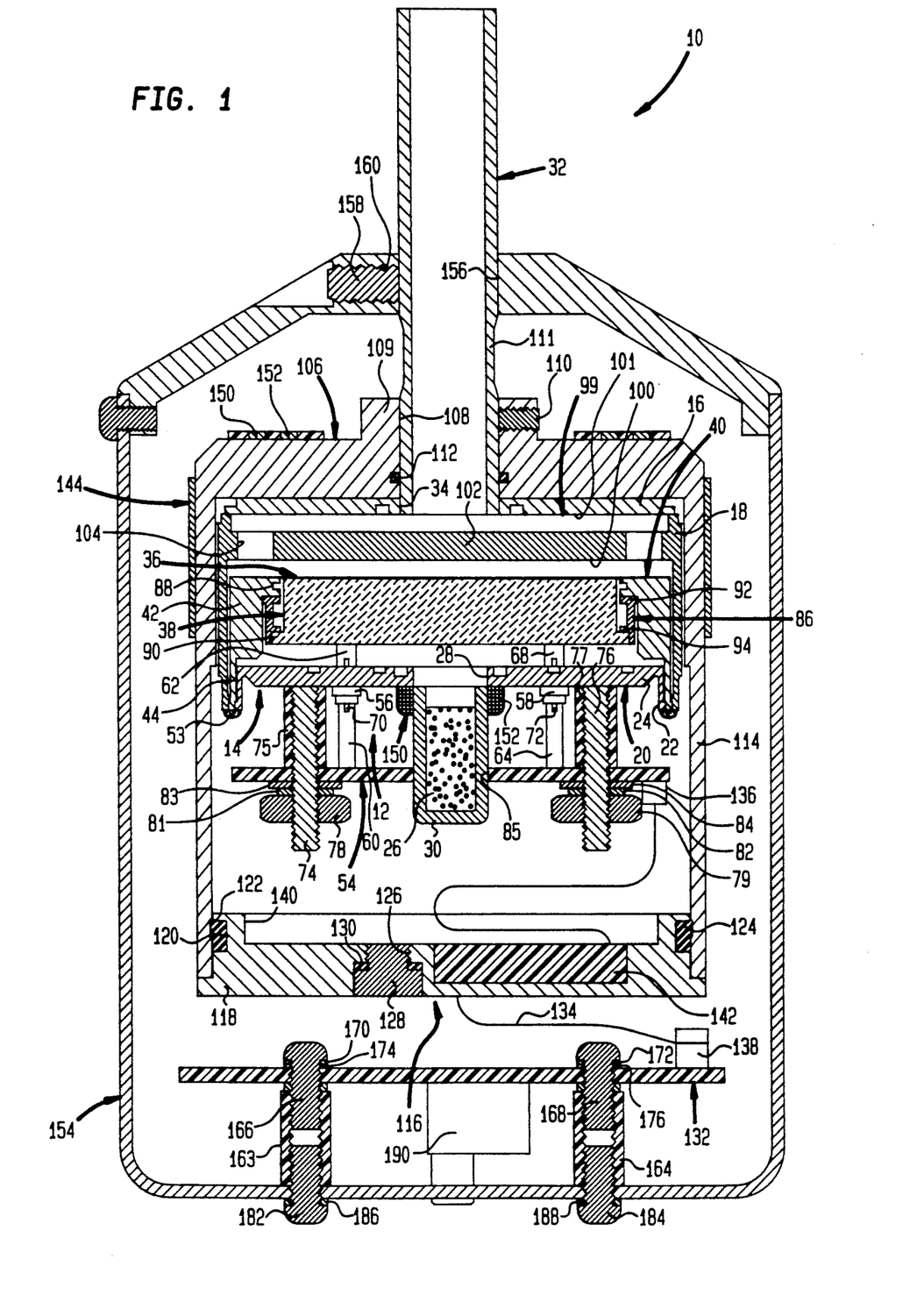
FIG. 1 is a sectional view of a capacitance pressure transducer in accordance with the present invention.

With reference to FIG. 1, a capacitance pressure transducer 10 in accordance with the present invention is illustrated. Capacitance pressure transducer 10 is provided with a cell 12. Cell 12 includes a cell housing 14 which has a circular front cover 16 and a cylindrical side cover 18. As illustrated, cylindrical side cover 18 is connected, at one end, to front cover 16. Cell housing 14 is also provided with a back cover 20 having a skirt 22 configured to fit inside side cover 18 in a spaced relationship thereto. A recessed circular end wall 24 of back cover 20 is peripherally connected to skirt 22 by being integrally formed therewith.

Capacitance pressure transducer 10 is designed to measure absolute pressure. Therefore, in order to maintain a reference vacuum within cell housing 14 (beneath the diaphragm) a plug like getter 26, formed of Zirconium powder, is provided to adsorb gases outgassing from the components contained within cell housing 14. Plug-like getter 26 is exposed through a central opening 28 in circular end wall 24 and is covered by hollow member 30. Hollow member 30 is welded to end wall 24 of back cover 20.

Cell 12 also includes an inlet tube 32 connected to front cover 16 of cell housing 14 so as to be located within an opening 34 defined in circular front cover 16. Inlet tube 32 allows a gas, the pressure of which is to be measured by pressure transducer 10, to enter cell 12. Cell 10 is connected to an external enclosure (discussed and designated by reference numeral 154 hereinbelow) solely by means of inlet tube 34. The advantage of this is that forces applied to the external enclosure will not set up force couples within cell 12. Additionally, the single point attachment will also help to prevent the formation of adverse thermal gradients within cell 12.

The pressure of the gas is electronically measured by the pressure sensitive plane parallel plate capacitor located within cell housing 14. Such plate capacitor is formed by a diaphragm 36 overlying electrodes of an electrode disk 38. Diaphragm 36 is conductive and electrode disk 38 carries, in a conventional manner, coated central and outlying circular electrodes, beneath diaphragm 36. A small gap exists between diaphragm 36 and the electrodes of electrode disk 38 to produce a capacitance between diaphragm 36 and the electrodes of electrode disk 38. As the pressure of the gas increases, diaphragm 36 deflects toward electrode disk 38 to increase the capacitance, which can be measured and correlated with the pressure of the gas.

Figure 2:
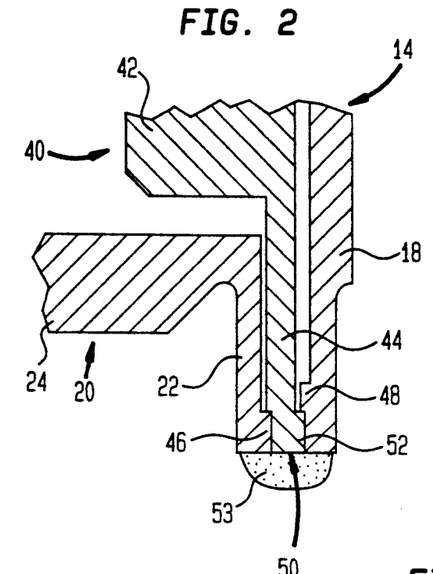
FIG. 2 is an enlarged, fragmentary sectional view of a connection between a cell housing and a tension ring used in the capacitance pressure transducer illustrated in FIG. 1.

With additional reference now to FIG. 2, diaphragm 36 is connected to a tension ring 40 by stitch welding.

Tension ring 40 has an annular portion 42 (to which diaphragm 36 is connected) and a pliable shell-like portion 44 integrally formed with annular portion 42. Shell-like portion 44 is located between cylindrical side cover 18 and cylindrical skirt 22 of cell housing 14. Cylindrical skirt 22 of back cover 20 and side cover 18 of cell housing 14 have inwardly directed locating projections 46 and 48. Shell-like portion 44 of tension ring 40 terminates in an annular end section 50 having a locating foot 52 engaged with inwardly directed projections 46 and 48 of side cover 18 and cylindrical skirt 22. In such manner, side cover 18, cylindrical skirt 22, and and shell-like portion 44 are held in a fixed relationship to one another prior to their connection by welding at projections 46 and 48 and locating foot 52 thereof by a weld 53. After connection of side cover 18, cylindrical skirt 22, and shell-like portion 44 of tension ring 40, a volume is formed between back cover 20 and diaphragm 36 for the formation of the reference vacuum.

As is evident, shell-like portion 44 is less stiff, or in other words, more flexible or pliable than the thicker annular portion 42 of tension ring 40. As a result, thermal stresses arising from the welding of cell housing 14 will tend to deform the more flexible shell-like portion 44 rather than the relatively stiffer annular portion 42 and therefore, diaphragm 36. Moreover, the same will hold true to mechanical forces applied to cell housing 14 while in use which will produce deformations of shell-like portion 44 rather than annular portion 42. Deformation of annular portion 42 of tension ring 40 and therefore diaphragm 36 is preferably further prevented by fabricating side and back covers 18 and 20 to be more flexible than annular portion 42 of tension ring 40. This is practically accomplished in the preferred embodiment by selection of wall thickness and material used in cell housing 14.

In the illustrated embodiment, shell-like portion 44 of tension ring 40 and cylindrical side cover 18 each have nominal wall thickness of about 0.75 mm. near their point of connection. Annular portion 42 has a nominal wall thickness of about 4.5 mm. Additionally, annular portion 42 and shell-like portion 44 of tension ring 40 each have an outer diameter of about 54 mm. and cylindrical side cover 18 has an outer diameter of about 56 mm. All of the aforementioned components are fabricated from Inconnel. Tension ring 40 is rough machined and heat treated at about 1400° F. for about 2 hours and then cooled for about 1.5 hours to about 300° F. Thereafter, tension ring 40 is given a final machining.

Although not illustrated, but as would be known in the art, electrode disk 38 is provided with apertures communicating between the front surface underlying diaphragm 36 and the opposed rear surface thereof. These apertures are coated with conductive material so that the coating of the electrodes is continuous with the coating within the bores extending through electrode disk 38. In order to apply the necessary voltages to the electrodes of electrode disk 38, an electrical connection is made between electrode disk 38 and components of a circuit board 54 by feed throughs 56 and 58 and spring-like conductors 60, 62, 64, 68 engaged with pins 70 and 72 of feed throughs 56 and 58. Circuit board 54 is connected by threaded studs 74 and 76 to recessed circular end wall 24 of back cover 20, and is held in place between spacers 75; 77 and nuts 78; 79 which are locked in place against circuit board 54 by lock washers 81 and 82 bearing against washers 83 and 84. A central opening 85 is provided within circuit board 54 to accommodate hollow member 30 of getter 26.

As discussed above, annular portion 42 of tension ring 40 and thus, diaphragm 36 incorporate a flexible mounting. In order to maintain electrode disk 38 is a fixed position relative to diaphragm 36 a mounting is provided to mount electrode disk 38 solely to tension ring 40. Thus, electrode disk 38 will move with tension ring 40 and be held in a fixed position relative to diaphragm 36. The mounting used in retaining electrode disk 30 in its fixed position is an annular support member 86. Annular support member 86 is connected at its opposite annular ends to tension ring 40 and electrode disk 38. With additional reference to FIG. 3, tension ring 40 is provided with an annular inner shoulder 88. Electrode disk 38 is provided with an annular inner ledge 90 located opposite to annular inner shoulder 88 of tension ring 40. The opposite annular ends of annular support member 86 are formed by an annular top flange section 92 which is welded to annular inner shoulder 88 and an annular L-like section 94 which is bonded, such as by a glass frete bonding material, to inner annular ledge 90 of ceramic disk 38.

Figure 3:
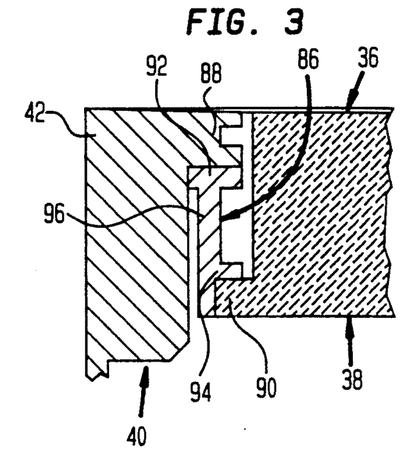
FIG. 3 is an enlarged, fragmentary sectional view of a connection between an electrode disk and a tension ring used in the capacitance pressure transducer illustrated in FIG. 1.

Electrode disk 38 is fabricated from ceramic while tension ring 40 is fabricated from Inconnel. In order for the bond between electrode disk 38 and annular support member 86 to be minimally stressed, annular support member 86 is fabricated from steel having the same thermal coefficient of expansion as the ceramic forming electrode disk 38.

Figure 4:
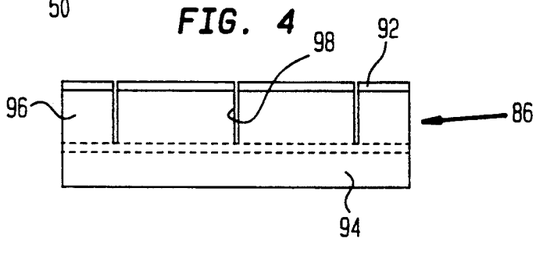
FIG. 4 is an elevational view of an annular support member used in FIG. 3 to connect the electrode disk to the tension ring.

As illustrated, top flange section 92 and L-like section 94 of annular support member 86 is connected by an annular central, shell-like web section 96. As can be appreciated, tension ring 40, being fabricated from Inconnel has a different thermal expansion coefficient than electrode disk 38 (fabricated from ceramic) and annular support member 88. In order to allow for differential thermal expansion of these aforementioned components, in a radial direction of annular support member 86 a plurality of fenestrations 98 are provided. Fenestrations 98 pass through annular top flange section 92 and web section 96 of annular support member 86. Fenestrations 98 divide annular support member 86 into a plurality of regions capable of flexing upon the differential expansion. In this regard, in the illustrated embodiment, 8 equally spaced fenestrations 98 are provided and shell-like web section 98 has an outer diameter of about 4.5 cm. and is about 0.60 mm. thick. As could be appreciated by those skilled in the art, in complete dependence upon specific design considerations, more or less fenestrations could be provided. Moreover, fenestrations 98 could extend into L-like section 94 of annular support member 86 (or for that matter the height of annular support member 86) to further decrease the stiffness of annular support member 86.

Figure 5:
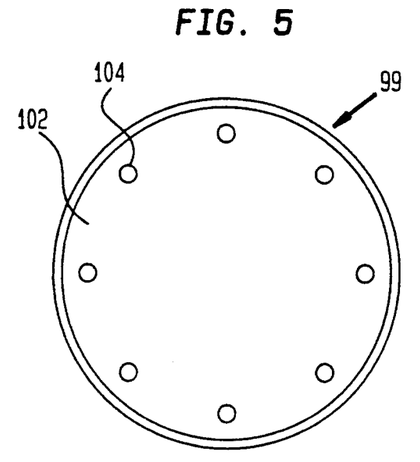
FIG. 5 is a top plan view of the baffle plate utilized in the capacitance pressure transducer illustrated in FIG. 1.

With reference to FIG. 5, a circular baffle plate 99 is provided for protecting diaphragm 36 from damage and to thermally guard diaphragm 36. Baffle plate 99 comprises a circular disk 102 which is peripherally connected to side cover 18 of cell housing 14 by being integrally formed therewith. In order to permit exposure of diaphragm 36 to the gas, circular disk 102 is provided with a plurality of peripheral openings 104. If desired, each of the peripheral openings 104 could be covered with a mesh screen to filter particulates. As a result, diaphragm 36 is not directly exposed to gas and possible particulate contamination entering through inlet tube 32. Also, baffle plate 99 acts as a radiation shield to prevent heat transfer from the diaphragm. An additional important feature is that baffle plate 99 divide cell housing 14 into a diaphragm chamber 100 proximally located with respect to diaphragm 36 and a baffle chamber 101 between diaphragm chamber 100 and inlet tube 32. The provision of baffle chamber 101 increases the residence time of the gas to be measured before reaching diaphragm 36 to an extent that the gas is allowed to reach thermal equilibrium with respect to cell 12. This prevents heat transfer between the diaphragm and the gas and consequently, a change in diaphragm tension and thus, a diaphragm deflection having some degree of dependence on the temperature of the gas to be measured.

An air tight environmental enclosure 106 is provided to thermally isolate cell 12 by maintaining it at an elevated temperature, above surrounding ambient temperature. Additionally, as mentioned above, changes in atmospheric pressure can act on a prior art cell housing, deform it slightly and thereby effect alignment and/or tension of the diaphragm. Air tight environmental enclosure 106 is also designed to have a sufficient rigidity so as essentially, not to deform in response to changes in atmospheric pressure. Since cell housing 14 is enclosed within air tight environmental enclosure 106, changes in atmospheric pressure will not act on cell housing 14 and thereby the internal components located within cell housing 14. Lastly, as will be discussed, air tight environmental enclosure 106 also provides a low humidity environment for cell 12 and its associated electronics.

Air tight environmental enclosure 106 has an inner inlet tube opening 108 defined in an end wall 109 thereof and aligned with opening 32 of cell housing 14. Inlet tube 32 passes through inner inlet tube opening 108 and is held in place by two set screws set at right angles, one of which designated by reference numeral 110 and can be seen in FIG. 1. A hermetic seal is effectuated between inlet tube 32 and intermediate opening 108 by an O-ring 112. The inlet tube 32 thereby serves as the sole support of environmental enclosure 106 to prevent thermal gradients from acting on environmental enclosure 106. Also contributing to thermal stabilization of air tight environmental enclosure 106 is a thin section 111 in inlet tube 32 and, although not illustrated, insulating foam with all seams sealed which in practice would surround air tight environmental enclosure 106.

Air tight environmental enclosure 106 is also provided with a sidewall 114 of cylindrical configuration and a lid 116 having a peripheral portion 118 configured to closely fit within sidewall 114. End wall 109, sidewall 114, and lid 116 are thick machined components to impart environmental enclosure 106 with the required rigidity and also, to minimize the existence of thermal gradients therein. In the illustrated embodiment, cylindrical sidewall 114 is as thick as 2.54 mm. and is made of Aluminum 1100.

Figure 6:
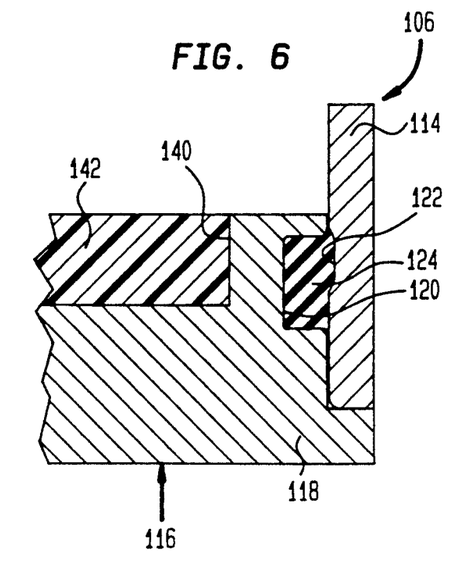
FIG. 6 is an enlarged, fragmentary sectional view of a connection between a sidewall and lid of an environmental enclosure used in the capacitance pressure transducer illustrated in FIG. 1.

With reference to FIG. 6, sidewall 114 and peripheral portion 118 of lid 116 are provided with a pair of opposed grooves 120 and 122. An O-ring 124 is configured to simultaneously seat within grooves 120 and 122 in order to effectuate a seal between lid 116 and sidewall 114 of environmental enclosure 106. Additionally, O-ring 124 serves to connect lid 116 to sidewall 114 in a self latching manner. In order to gain access to circuit board 54, lid 116 is provided with a threaded opening 126 and a threaded plug 128 bearing against an O-ring 130.

The electronic circuitry utilized in capacitance pressure transducer 10 is well known and forms no part of the present invention. It is split up between circuit board 54, which has already been discussed, and a circuit board 132 lying beneath environmental enclosure 106. In order to effectuate a connection between circuit boards 54 and 132, a ribbon-like cable 134 is provided. Cable 134 is sufficiently thin so as not to conduct excessive heat from environmental enclosure 106. In a manner well known in the art, cable 134 connects between circuit boards 54 and 132 by electrical plug like connectors 136 and 138. Feed through of electrical cable 134 is accomplished by lid 116 having a depression 140 filled with epoxy 142. Cable 134 passes through an opening in lid 116 and depression 142 and is potted by epoxy 142 to accomplish the feed through. A small section of cable 143 is stripped of insulation where it passes through the potting material.

Figure 7:
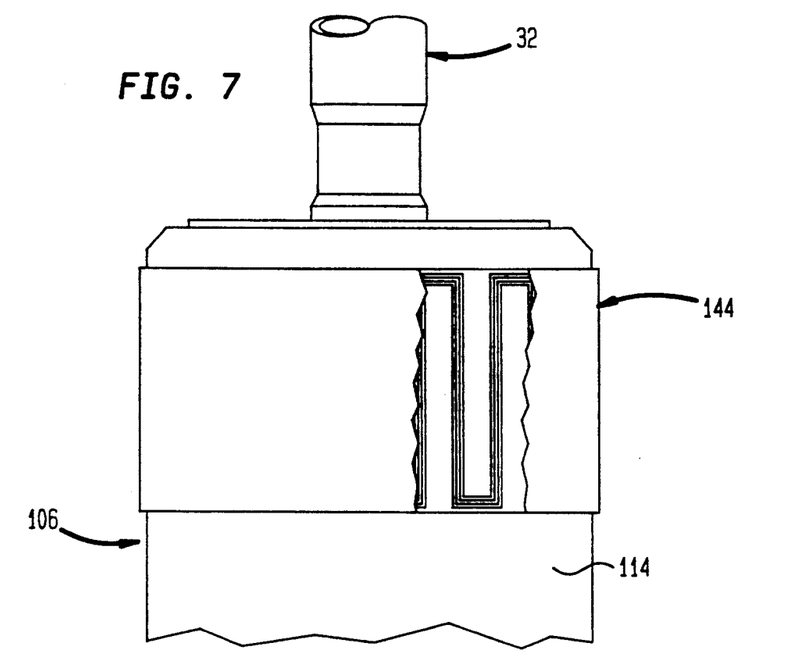
FIG. 7 is a fragmentary elevational view of the environmental enclosure used in the capacitance pressure transducer of FIG. 1.
Figure 8:
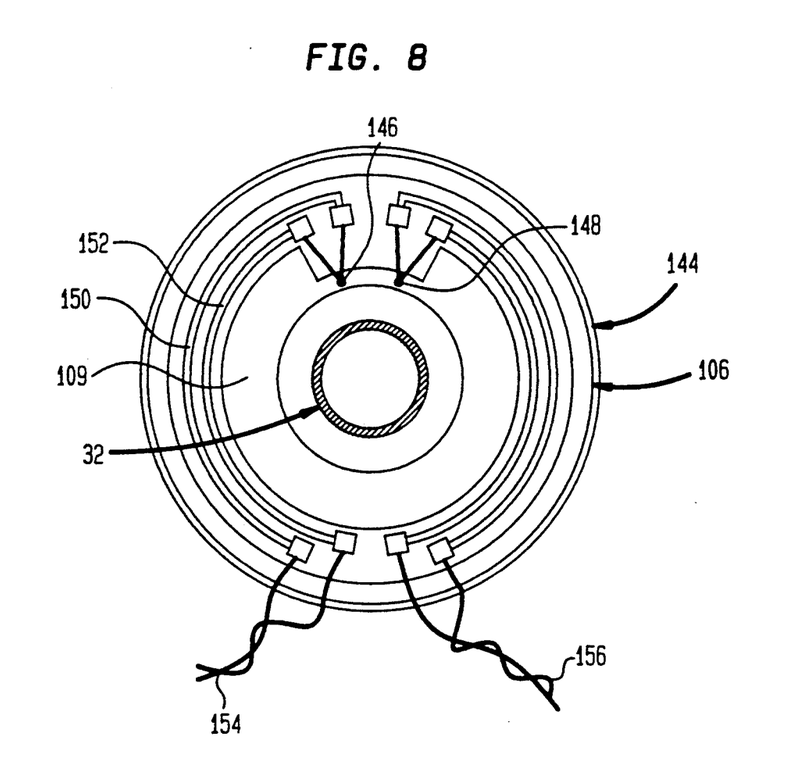
FIG. 8 is a top plan view of FIG. 7.

With reference to FIGS. 7 and 8, a foil resistance heating element 144 formed in KAPTON insulation is attached to environmental enclosure 106 by pressure sensitive adhesive provided on the far side of foil resistance heating element 144. Its resistance is about 160 ohms and has an operating temperature of about 45° C. to maintain environmental enclosure 106 and cell housing 14 at a like, constant temperature. The KAPTON insulation serves to electrically insulate electrical heating elements embedded therein. Preferably, the insulation is about 0.05 mm. thick so that the heat generated can be conduced to air tight environmental enclosure 106. Although not illustrated, foil resistance heating element 144 is powered by a power supply and regulated by electronic control circuitry provided on circuit board 132.

The power output of resistance heating element 144 is regulated to maintain the foregoing operating temperature by conventional electronic control circuitry contained on circuit board 132. Two thermistors 146 and 148, connected to end wall 109 of environmental enclosure 106 by thermally conductive adhesive, are provided to generate a signal referable to the temperature of air tight environmental enclosure 106 which can in turn be used by the electronic control circuitry to control the power output of resistance heating element 144. The leads to thermistors 146 and 148, along which the temperature referable signal is conducted, are thermally anchored to environmental enclosure 106 by KAPTON insulated conductors 150 and 152 buried in the thermally conductive adhesive on end wall 109 of environmental enclosure 106. The KAPTON insulation here is again about 0.05 mm. thick.

Conductors 150 and 152 act to shunt heat from environmental enclosure 106 to twisted lead pairs 154 and 156 and thus prevent cooling of thermistors 146 and 148. Electrically insulated twisted lead pairs 154 and 156 of low thermal conduction are provided to make the final connection to circuit board 132. It should be mentioned that since environmental enclosure 106 is being maintained at above room temperature, heat could potentially be conducted from thermistors 146 and 148 through their electrical connections, mentioned above. As a result, thermistors 146 and 148 would always supply a lower than actual temperature reading. The above mentioned mounting of conductors 150 and 152 and twisted lead pairs 154 and 156 prevent such heat transfer and consequent cooling of thermistors 146 and 148.

The maintenance of cell 12 at a constant temperature of 45° C. or for that matter any constant temperature provides cell 12 and its components with thermal stability. A result of this can be that, at low pressures, the gas to be measured will suffer an increase in pressure. Such an increase in pressure due to, as termed in the art, "thermal transpiration" will result in an erroneous gas pressure measurement. However, by designing baffle chamber 101 and inlet tube 32 to have characteristic dimensions (that is their smallest dimension) greater than that of the mean free path of gas molecules at the lowest pressure to be measured by cell 12, thermal transpiration effects will be suppressed. As can be appreciated by those skilled in the art, the characteristic dimensions will of course change with the potential temperature difference between cell 12 and the gas to be measured and the gas pressure to be measured by cell 12.

A desiccant 150, attached to end wall 24 of back cover 20 is contained within environmental enclosure 106 to adsorb moisture which could otherwise adversely influence the stability of the electronic components contained in circuit board 54. Desiccant 150 is electronically shielded by a metal screen 152 from the electronic components contained within circuit board 54 in order to suppress stray capacitance changes which might effect such electronic components.

An external enclosure 154 is provided for mechanical protection of of the insulating foam surrounding envrironmental enclosure 106. It also serves to house electronic components and controls lying outside of envirronmental enclosure 106. External enclosure 154 has an outer inlet tube opening 156 in alignment with inner inlet tube opening 108 and opening 32 of environmental enclosure 106 and cell housing 14, respectively. Inlet tube 34 is connected to external enclosure 154 by means of a set screw 158 tightened within an aperture 160 thereof. At the opposite end of external enclosure 154, circuit board 132 is connected to a pair of internally threaded rods 163 and 164 by screws 166 and 168, which are locked in place by lock washers 170 and 172 and washers 174 and 176. Internally threaded rods 178 and 180 are in turn connected to external enclosure 154 by screws 182 and 184 which are locked in place by lock washers 186 and 188. A zero adjust control 190, known in the art, projects out of external enclosure 154 for zero adjustment of capacitance pressure transducer 10.

While a preferred embodiment has been shown and described in detail, it would readily be understood by those skilled in the art that numerous editions, omissions and changes can be made without departing from the spirit and scope of the invention.

I claim:

1. A capacitance pressure transducer for measuring pressure of a gas, said capacitance pressure transducer comprising:

an external enclosure having an outer inlet tube opening;

an air tight environmental enclosure located within the external enclosure and having an inner inlet tube opening aligned with the outer inlet tube opening of the external enclosure and a sufficient rigidity so as essentially, not to deform in response to changes in atmospheric pressure; and a cell including, a cell housing located within the environmental enclosure so that the changes in atmospheric pressure do not deform the cell housing, a tension ring located within the cell housing, a circular diaphragm peripherally connected to the tension ring, tension ring connection means for connecting the tension ring to the cell housing, the tension ring connection means having a lower stiffness than the tension ring so that thermal and mechanical loadings applied to the cell housing essentially produce deformation in the tension ring connection means rather than in the tension ring and therefore, the diaphragm, an electrode disk located within the tension ring and positioned so as to form a plane parallel capacitor plate with the diaphragm, electrode disk connection means for connecting the electrode disk solely to the tension ring so that the electrode disk is held in a fixed position relative to the diaphragm and differential thermal expansion is permitted between the electrode disk and the tension ring, an inlet tube, acting as a sole connection of the cell housing to the external enclosure, the inlet tube in communication, at one end, with the interior of the cell housing opposite to the diaphragm, and extending through the inner and outer inlet tube openings of the environmental and external enclosures, and baffle means dividing the cell housing, between the inlet tube and the diaphragm into a diaphragm chamber proximally located with respect to the diaphragm and a baffle chamber located between the diaphragm chamber and the inlet tube and through which the gas flows before reaching the diaphragm chamber for allowing the gas to reach thermal equilibrium with respect to the cell before reaching the diaphragm.

2. The capacitance pressure transducer of claim 1, wherein:

the tension ring has an an annular portion to which the diaphragm is peripherally connected;

the tension ring connection means comprises the tension ring having a cylindrical shell-like portion, extending from the annular portion and terminating in an annular end section connected to the cell housing; and the annular and shell-like portions of the tension ring are respectively stiff and flexible relative to one another.

3. The capacitance pressure transducer of claim 2, wherein:

cell housing has, circular front and back covers connected by a cylindrical side cover; and the cylindrical, shell-like portion of the tension ring is spaced inside the side cover of the cell housing and the annular end section peripherally connects the side and back covers of the cell housing so that a volume for a reference vacuum is formed between the diaphragm and the back cover of the cell housing.

4. The capacitance pressure transducer of claim 3, wherein the back cover has a circular end wall and a cylindrical skirt spaced inside the shell-like portion of the tension ring and connecting the annular end section of the tension ring to the end wall so that the end wall is recessed from a juncture of the annular end section of the tension ring, the side cover of the cell housing, and the cylindrical skirt.

5. The capacitance pressure transducer of claim 4, wherein:

the juncture of the annular end section of the tension ring, the side cover of the cell housing, and the cylindrical skirt is welded;

the skirt of the back cover and the side cover of the cell housing have inwardly directed locating projections; and the annular end section of the shell-like portion of tension ring has a locating foot engaged with the inwardly directed locating projections to locate the shell-like portion of the tension ring, the skirt of the back cover, and the side cover of the cell housing in a fixed relationship relative to one another prior to welding.

6. The capacitance pressure transducer of claim 2, wherein the electrode disk connection means comprises an annular support member, at opposite annular ends, connecting the annular portion of the tension ring to the electrode disk, the annular support member having a plurality of fenestrations oriented in an axial direction of said annular support member and dividing the annular support member into a plurality of regions capable of flexing upon differential expansion between the tension ring and the electrode disk.

7. The capacitance pressure transducer of claim 6, wherein:

the tension ring is fabricated from steel;

the electrode disk is fabricated from ceramic;

the annular support member is fabricated from a stainless steel having substantially the same coefficient of expansion as the ceramic forming the electrode disk; and the annular support member is welded to the tension ring and is bonded to the electrode disk at the opposite annular ends of the annular support member.

8. The capacitance pressure transducer of claim 7, wherein the baffle chamber and the inlet tube each have a characteristic dimension greater than a mean free path of molecules of the gas at a lowest pressure to be measured to suppress thermal transpiration effects.

9. The capacitance pressure transducer of claim 8, wherein the baffle means comprises a circular disk integrally formed with the side cover of cell housing and having a plurality of peripheral openings for passage of the gas from the baffle chamber to the diaphragm chamber.

10. The capacitance pressure transducer of claim 9, wherein the environmental enclosure has, at least one sidewall;

a lid having a peripheral portion configured to closely fit within the at least one sidewall, the side wall and the peripheral portion of the lid having opposed grooves, an O-ring configured to simultaneously seat within the opposed grooves of the sidewall and the lid and to connect the lid to the sidewall in an air tight and self-latching manner; and an end wall connected to the at least one sidewall opposite to the lid and having the inner inlet tube opening defined therein and a single point of attachment of the environmental enclosure to the external enclosure at the inlet tube.

11. The capacitance pressure transducer of claim 10, further comprising a desiccant located within the environmental enclosure to adsorb moisture.

12. The capacitance pressure transducer of claim 11, wherein:

cell housing has, circular front and back covers connected by a cylindrical side cover; and the cylindrical, shell-like portion of the tension ring is spaced inside the side cover of the cell housing and the annular end section peripherally connects the side and back covers of the cell housing so that a volume for a reference vacuum is formed between the diaphragm and the back cover of the cell housing.

13. The capacitance pressure transducer of claim 12, wherein the back cover has a circular end wall and a cylindrical skirt spaced inside the shell-like portion of the tension ring and connecting the annular end section of the tension ring to the end wall so that the end wall is recessed from a juncture of the annular end section of the tension ring, the side cover of the cell housing, and the cylindrical skirt.

14. The capacitance pressure transducer of claim 13, wherein:

the juncture of the annular end section of the tension ring, the side cover of the cell housing, and the cylindrical skirt is welded;

the skirt of the back cover and the side cover of the cell housing have inwardly directed locating projections; and the annular end section of the shell-like portion of tension ring has a locating foot engaged with the inwardly directed locating projections to locate the shell-like portion of the tension ring, the skirt of the back cover, and the side cover of the cell housing in a fixed relationship relative to one another prior to welding.

15. The capacitance pressure transducer of claim 14, wherein:

the annular portion of the tension ring has an annular inner shoulder;

the electrode disk has an inner ledge located opposite to the annular shoulder of the tension ring;

the opposite annular ends of the annular support member are formed by an annular top flange in contact with the annular shoulder of the tension ring and an annular L-like flange in contact with the inner ledge of the electrode disc, and the annular support member also has a central shell-like web section connecting the top and L-like annular flanges and having the fenestrations defined therein.

16. The capacitance pressure transducer of claim 1, wherein the electrode disk connection means comprises an annular support member, at opposite annular ends, connecting the tension ring to the electrode disk, the annular support member having a plurality of fenestrations oriented in an axial direction of said annular support member and dividing the annular support member into a plurality of regions capable of flexing upon differential expansion between the tension ring and the electrode disk.

17. The capacitance pressure transducer of claim 16, wherein:

the tension ring is fabricated from steel;

the electrode is fabricated from ceramic;

the annular support member is fabricated from a stainless steel having substantially the same coefficient of expansion as the ceramic forming the electrode disk; and the annular support member is welded to the tension ring and is bonded to the electrode disk at the opposite annular ends of the annular support member.

18. The capacitance pressure transducer of claim 16, wherein:

the tension ring has an annular inner shoulder;

the electrode disk has an inner ledge located opposite to the annular shoulder of the tension ring;

the opposite annular ends of the annular support member are formed by an annular top flange in contact with the annular shoulder of the tension ring and an annular L-like flange in contact with the inner ledge of the electrode disc, and the annular support member also has a central shell-like web section connecting the top and L-like annular flanges and having the fenestrations defined therein.

19. The capacitance pressure transducer of claim 1, wherein the baffle chamber and the inlet tube each have a characteristic dimension greater than a mean free path of molecules of the gas at a lowest pressure to be measured to suppress thermal transpiration effects.

20. The capacitance pressure transducer of claim 19, wherein the baffle means comprises a circular disk integrally formed with the side cover of cell housing and having a plurality of peripheral openings for passage of the gas from the baffle chamber to the diaphragm chamber.

21. The capacitance pressure transducer of claim 1, further comprising a desiccant located within the environmental enclosure to adsorb moisture.

22. The capacitance pressure transducer of claim 1, wherein the environmental enclosure has, at least one sidewall;

a lid having a peripheral portion configured to closely fit within the at least one sidewall, the side wall and the peripheral portion of the lid having opposed grooves, an O-ring configured to simultaneously seat within the opposed grooves of the sidewall and the lid and to connect the lid to the sidewall in an air tight and self-latching manner; and an end wall connected to the at least one sidewall opposite to the lid and having the inner inlet tube opening defined therein and a single point of attachment of the environmental enclosure to the external enclosure at the inlet tube.

23. A cell for a capacitance pressure transducer to measure the pressure of a gas, said cell comprising:

a cell housing;

a tension ring located within the cell housing;

a circular diaphragm peripherally connected to the tension ring;

tension ring connection means for connecting the tension ring to the cell housing, the tension ring connection means integrally formed with the tension ring, both the tension ring and the tension ring connection means formed of a metal, the tension ring connection means welded to the housing and having a lower stiffness than the tension ring so that thermal stresses arising from welding the tension ring connection means to the housing and mechanical loadings applied to the cell housing essentially produce formation in the tension ring connection means rather than the tension ring;

an electrode disk located within the tension ring and positioned so as to form a plane parallel capacitor plate with the diaphragm;

electrode disk connection means for connection the electrode disk solely to the tension ring so that the electrode disk is held in a fixed position relative to the diaphragm and differential thermal expansion is permitted between the electrode disk and the tension ring; and an inlet in communication, at one end, with the interior of the cell housing.

24. The cell of claim 23, wherein:

the tension ring has an an annular portion to which the diaphragm is peripherally connected;

the tension ring connection means comprises the tension ring having a cylindrical shell-like portion, extending from the annular portion and terminating in an annular end section connected to the cell housing; and the annular and shell-like portions of the tension ring are respectively stiff and flexible relative to one another.

25. The cell of claim 24, wherein:

cell housing has, circular front and back covers connected by a cylindrical side cover; and the cylindrical, shell-like portion of the tension ring is spaced inside the side cover of the cell housing and the annular end section peripherally connects the side and back covers of the cell housing so that a volume for a reference vacuum is formed between the diaphragm and the back cover of the cell housing.

26. The cell of claim 25, wherein the back cover has a circular end wall and a cylindrical skirt spaced inside the shell-like portion of the tension ring and connecting the annular end section of the tension ring to the end wall so that the end wall is recessed from a juncture of the annular end section of the tension ring, the side cover of the cell housing, and the cylindrical skirt.

27. The cell of claim 26, wherein:

the juncture of the annular end section of the tension ring, the side cover of the cell housing, and the cylindrical skirt is welded;

the skirt of the back cover and the side cover of the cell housing have inwardly directed locating projections; and the annular end section of the shell-like portion of tension ring has a locating foot engaged with the inwardly directed locating projections to locate the shell-like portion of the tension ring, the skirt of the back cover, and the side cover of the cell housing in a fixed relationship relative to one another prior to welding.

28. The cell of claim 23, wherein the electrode disk connection means comprises an annular support member, at opposite annular ends, connecting the the tension ring to the electrode disk, the annular support member having a plurality of fenestrations oriented in an axial direction of said annular support member and dividing the annular support member into a plurality of regions capable of flexing upon differential expansion between the tension ring and the electrode disk.

29. The cell of claim 28, wherein:

the tension ring is fabricated from steel;

the electrode disk is fabricated from ceramic;

the annular support member is fabricated from a stainless steel having substantially the same coefficient of expansion as the ceramic forming the electrode disk; and the annular support member is welded to the tension ring and is bonded to the electrode disk at the opposite annular ends of the annular support member.

30. The cell of claim 29, wherein:

the tension ring has an annular inner shoulder;

the electrode disk has an inner ledge located opposite to the annular shoulder of the tension ring;

the opposite annular ends of the annular support member are formed by an annular top flange in contact with the annular shoulder of the tension ring and an annular L-like flange in contact with the inner ledge of the electrode disc, and the annular support member also has a central shell-like web section connecting the top and L-like annular flanges and having the fenestrations defined therein.

31. The cell of claim 23, further comprising baffle means dividing the cell housing, between the inlet tube and the diaphragm into a diaphragm chamber proximally located with respect to the diaphragm and a baffle chamber located between the diaphragm chamber and the inlet tube and through which the gas flows before reaching the diaphragm chamber for allowing the gas to reach thermal equilibrium with respect to the cell before reaching the diaphragm.

32. The cell of claim 31 wherein the baffle chamber and the inlet tube each have a characteristic dimension greater than a mean free path of molecules of the gas at a lowest pressure to be measured to suppress thermal transpiration effects.

33. The cell of claim 32 wherein the baffle means comprises a circular disk integrally formed with the side cover of cell housing and having a plurality of peripheral openings for passage of the gas from the baffle chamber to the diaphragm chamber.

34. The cell of claim 24, wherein the electrode disk connection means comprises an annular support member, at opposite annular ends, connecting the annular portion of the tension ring to the electrode disk, the annular support member having a plurality of fenestrations oriented in an axial direction of said annular support member and dividing the annular support member into a plurality of regions capable of flexing upon differential expansion between the tension ring and the electrode disk.

35. The cell of claim 34, wherein:

the tension ring is fabricated from steel;

the electrode disk is fabricated from ceramic;

the annular support member is fabricated from a stainless steel having substantially the same coefficient of expansion as the ceramic forming the electrode disk; and the annular support member is welded to the tension ring and is bonded to the electrode disk at the opposite annular ends of the annular support member.

36. The cell of claim 35, further comprising baffle means dividing the cell housing, between the inlet tube and the diaphragm into a diaphragm chamber proximally located with respect to the diaphragm and a baffle chamber located between the diaphragm chamber and the inlet tube and through which the gas flows before reaching the diaphragm chamber for allowing the gas to reach thermal equilibrium with respect to the cell before reaching the diaphragm.

37. The cell of claim 36 wherein the baffle chamber and the inlet tube each have a characteristic dimension greater than a mean free path of molecules of the gas at a lowest pressure to be measured to suppress thermal transpiration effects.

38. The cell of claim 37 wherein the baffle means comprises a circular disk integrally formed with the side cover of cell housing and having a plurality of peripheral openings for passage of the gas from the baffle chamber to the diaphragm chamber.

39. The cell of claim 38, wherein:

cell housing has, circular front and back covers connected by a cylindrical side cover; and the cylindrical, shell-like portion of the tension ring is spaced inside the side cover of the cell housing and the annular end section peripherally connects the side and back covers of the cell housing so that a volume for a reference vacuum is formed between the diaphragm and the back cover of the cell housing.

40. The cell of claim 39, wherein the back cover has a circular end wall and a cylindrical skirt spaced inside the shell-like portion of the tension ring and connecting the annular end section of the tension ring to the end wall so that the end wall is recessed from a juncture of the annular end section of the tension ring, the side cover of the cell housing, and the cylindrical skirt.

41. The cell of claim 40, wherein:

the juncture of the annular end section of the tension ring, the side cover of the cell housing, and the cylindrical skirt is welded;

the skirt of the back cover and the side cover of the cell housing have inwardly directed locating projections; and the annular end section of the shell-like portion of tension ring has a locating foot engaged with the inwardly directed locating projections to locate the shell-like portion of the tension ring, the skirt of the back cover, and the side cover of the cell housing in a fixed relationship relative to one another prior to welding.

42. The cell of claim 41, wherein:

the annular portion of the tension ring has an annular inner shoulder;

the electrode disk has an inner ledge located opposite to the annular shoulder of the tension ring;

the opposite annular ends of the annular support member are formed by an annular top flange in contact with the annular shoulder of the tension ring and an annular L-like flange in contact with the inner ledge of the electrode disc, and the annular support member also has a central shell-like web section connecting the top and L-like annular flanges and having the fenestrations defined therein.

43. In a cell for a capacitance pressure transducer to measure the pressure of a gas having, a cell housing, a tension ring located within the cell housing, a circular diaphragm peripherally connected to the tension ring, and an electrode disk positioned so as to form a plane parallel capacitor plate with the diaphragm; the improvement comprising:

tension ring connection means for connecting the tension ring to the cell housing, the tension ring connection means integrally formed with the tension ring, both the tension ring and the tension ring connection means formed of a metal, the tension ring connection means welded to the housing and having a lower stiffness than the tension ring so that thermal stresses arising from welding and tension ring connection means to the housing and mechanical loadings applied to the cell housing essentially produce deformation in the tension ring connection means rather than the tension ring.

44. The improvement of claim 43, wherein:
the tension ring has an an annular portion to which the diaphragm is peripherally connected;
the tension ring connection means comprises the tension ring having a cylindrical shell-like portion, extending from the annular portion and terminating in an annular end section connected to the cell housing; and
the annular and shell-like portions of the tension ring are respectively stiff and flexible relative to one another.

45. The improvement of claim 44, wherein:
cell housing has, circular front and back covers connected by a cylindrical side cover; and
the cylindrical, shell-like portion of the tension ring is spaced inside the side cover of the cell housing and the annular end section peripherally connects the side and back covers of the cell housing so that a volume for a reference vacuum is formed between the diaphragm and the back cover of the cell housing.

46. The improvement of claim 45, wherein the back cover has a circular end wall and a cylindrical skirt spaced inside the shell-like portion of the tension ring and connecting the annular end section of the tension ring to the end wall so that the end wall is recessed from a juncture of the annular end section of the tension ring, the side cover of the cell housing, and the cylindrical skirt.

47. The improvement of claim 46, wherein:
the juncture of the annular end section of the tension ring, the side cover of the cell housing, and the cylindrical skirt is welded;
the skirt of the back cover and the side cover of the cell housing have inwardly directed locating projections; and
the annular end section of the shell-like portion of tension ring has a locating foot engaged with the inwardly directed locating projections to locate the shell-like portion of the tension ring, the skirt of the back cover, and the side cover of the cell housing in a fixed relationship relative to one another prior to welding.

48. The improvement of claim 47, wherein:
the skirt and the side cover have inwardly directed locating projections; and
the annular end section of the shell-like portion of tension ring has a locating foot engaged with the inwardly directed locating projections to locate the shell-like portion of the tension ring, the skirt, and the side cover in a fixed relationship relative to one another prior to connection.

49. In a cell for a capacitance pressure transducer to measure the pressure of a gas having, a cell housing, a tension ring connected to and located within the cell housing, a circular diaphragm peripherally connected to the tension ring, and an electrode disk located within the tension ring and positioned so as to form a plane parallel capacitor plate with the diaphragm, the improvement comprising:
an annular support member, at opposite annular ends, connecting the tension ring to the electrode disk, the annular support member having a plurality of fenestrations oriented in an axial direction of said annular support member and dividing the annular support member into a plurality of regions capable of flexing upon differential expansion between the tension ring and the electrode disk.

50. The improvement of claim 49, wherein:
the tension ring is fabricated from steel;
the electrode disk is fabricated from ceramic;
the annular support member is fabricated from a stainless steel having substantially the same coefficient of expansion as the ceramic forming the electrode disk; and
the annular support member is welded to the tension ring and is bonded to the electrode disk at the opposite annular ends of the annular support member.

51. The improvement of claim 50, wherein:
the tension ring has an annular inner shoulder;
the electrode disk has an inner ledge located opposite to the annular shoulder of the tension ring;
the opposite annular ends of the annular support member are formed by an annular top flange in contact with the annular shoulder of the tension ring and an annular L-like flange in contact with the inner ledge of the electrode disc, and
the annular support member also has a central shell-like web section connecting the top and L-like annular flanges and having the fenestrations defined therein.

52. In a cell of a capacitance pressure transducer for measuring the pressure of a gas having, a cell housing, a plane parallel capacitor plate including a diaphragm, and an inlet tube in communication, at one end, with the interior of the cell housing, the improvement comprising:
baffle means dividing the cell housing, between the inlet tube and the diaphragm into a diaphragm chamber proximally located with respect to the diaphragm and a baffle chamber located between the diaphragm chamber and the inlet tube and through which the gas flows before reaching the diaphragm chamber for allowing the gas to reach thermal equilibrium with respect to the cell before reaching the diaphragm.

53. The improvement of claim 52 wherein the baffle chamber and the inlet tube each have a characteristic dimension greater than a mean free path of molecules of the gas at a lowest pressure to be measured to suppress thermal transpiration effects.

54. The improvement of claim 53, wherein the baffle means comprises a circular disk integrally formed with the side cover of cell housing and having a plurality of peripheral openings for passage of the gas from the baffle chamber to the diaphragm chamber.

55. In a capacitance pressure transducer having, an external enclosure and a cell including, a cell housing containing a plane parallel capacitor plate, and an inlet tube connected to the cell housing and extending from the external enclosure, the improvement comprising:
an air tight environmental enclosure located within the external enclosure and enclosing the cell housing with the inlet tube extending therefrom, the environmental enclosure having a sufficient rigidity so as essentially not to deform in response to changes in atmospheric pressure and thereby prevent the changes in atmospheric pressure from deforming the cell housing;

said environmental enclosure having,
a sidewall of cylindrical configuration,
a circular lid having a peripheral portion configured to closely fit within the sidewall, the sidewall and the peripheral portion of the lid having opposed grooves, and
an O-ring configured to simultaneously seat within the opposed grooves and to connect the lid to the sidewall in an air tight and self-latching manner.

56. The improvement of claim 55 wherein the environmental enclosure also has an opposite end wall connected to the lid by the sidewall and having, an inlet tube opening through which the inlet tube also extends, sealing means for sealing the environmental enclosure at the inlet tube, and attachment means for attaching the environmental enclosure to the external enclosure solely by the inlet tube.

57. The improvement of claim 55, further comprising an electronically shielded desiccant attached to the cell housing so as to be contained within the environmental enclosure.

58. In a capacitance pressure transducer having, an external enclosure and a cell including, a cell housing containing a plane parallel capacitor plate, and an inlet tube connected to the cell housing and extending from the external enclosure, an environmental enclosure located within the external enclosure and enclosing the cell housing with the inlet tube extending therefrom, electrical heating means for heating the environmental enclosure and thereby the cell housing and the plane parallel capacitor plate to a temperature above the surrounding ambient atmosphere, and temperature sensing means connected to the environmental enclosure for generating a signal referable to the temperature of the environmental enclosure and used in controlling the electrical heating means so that the temperature of the environmental enclosure is constant, the improvement comprising:

electrical conductor means for conducting the signal to a temperature controller;
the electrical conductor means connected to the environmental enclosure and in good thermal contact therewith to shunt heat from the environmental enclosure to the temperature sensing means and thereby, to prevent the cooling thereof.

59. The improvement of claim 58, wherein the environmental enclosure is air tight and has a sufficient rigidity so as essentially not to deform in response to changes in atmospheric pressure and thereby prevents the changes in atmospheric pressure from deforming the cell housing.

* * * * *

UNITED STATES PATENT AND TRADEMARK OFFICE
CERTIFICATE OF CORRECTION

PATENT NO. : 5,271,277
DATED : December 21, 1993
INVENTOR(S) : Robert C. Pandorf It is certified that error appears in the above-indentified patent and that said Letters Patent is hereby corrected as shown below:

Column 14, line 54, after "electrode" insert --disk--.

Column 15, line 67, delete "formation" and substitute --deformation-- therefor.

Column 16, line 4, delete "connection" and substitute --connecting-- therefor.

Column 16, line 22, after "inlet" insert --tube--.

Signed and Sealed this

Sixth Day of September, 1994

Attest:

BRUCE LEHMAN

*Attesting Officer*  *Commissioner of Patents and Trademarks*